United States Patent [19]

Ginaven

[11] 4,042,511
[45] Aug. 16, 1977

[54] LOW PROFILE STATIC SCREEN

[75] Inventor: Marvin E. Ginaven, Springfield, Ohio

[73] Assignee: The Bauer Bros. Co., Springfield, Ohio

[21] Appl. No.: 617,186

[22] Filed: Sept. 26, 1975

Related U.S. Application Data

[63] Continuation of Ser. No. 404,765, Oct. 9, 1973, abandoned.

[51] Int. Cl.$^2$ .............................................. B07B 1/04
[52] U.S. Cl. .................................. 210/386; 209/250;
  209/283; 210/419; 210/489; 210/498
[58] Field of Search ............... 209/250, 273, 274, 281,
  209/283, 392, 393, 395; 210/251, 255, 386, 413,
  414, 415, 418, 419, 456, 489, 498, 499

[56] References Cited

U.S. PATENT DOCUMENTS

| | | | |
|---|---|---|---|
| 1,595,685 | 8/1926 | Parini | 209/392 X |
| 2,916,142 | 12/1959 | Fontein | 209/274 |
| 2,973,865 | 3/1961 | Cibula | 209/348 X |
| 3,259,244 | 7/1966 | Kaljo et al. | 209/281 X |
| 3,572,505 | 3/1971 | Jongbloed | 209/393 X |
| 3,747,758 | 7/1973 | Kerr | 210/386 X |

FOREIGN PATENT DOCUMENTS

| | | | |
|---|---|---|---|
| 476,880 | 9/1951 | Canada | 209/281 |
| 281,721 | 10/1913 | Germany | 210/483 |
| 685,081 | 11/1939 | Germany | 210/413 |
| 264,536 | 9/1927 | United Kingdom | 209/273 |
| 1,392,406 | 4/1975 | United Kingdom | 209/269 |

Primary Examiner—Thomas G. Wyse
Assistant Examiner—R. G. Mukai
Attorney, Agent, or Firm—Jerome P. Bloom

[57] ABSTRACT

Apparatus for separating or classifying the contents of a flowing slurry comprising a descending flow surface having a low profile and associated therewith a relatively low head box, the latter of which is distinguished by a relatively restricted cross sectional area adjacent its top. The flow surface is characterized by screen sections successive of which differ in orientation and profile whereby to produce a compact structure having a high capacity for separation of liquid from a flowing slurry. The design of the head box is such to enable a fast and effective delivery of slurry in spite of the low head provided.

18 Claims, 4 Drawing Figures

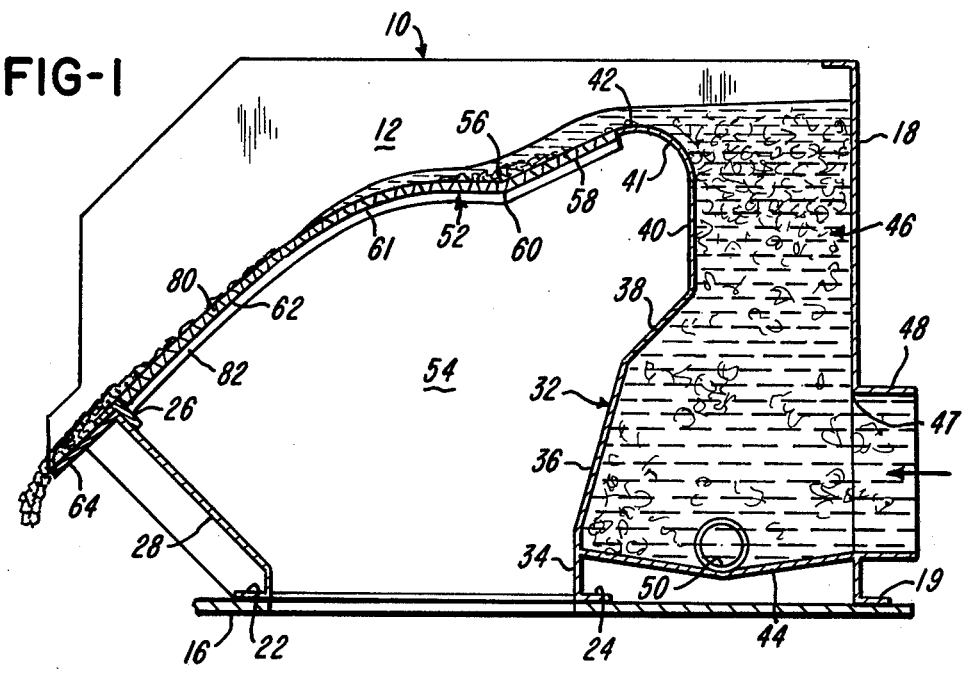
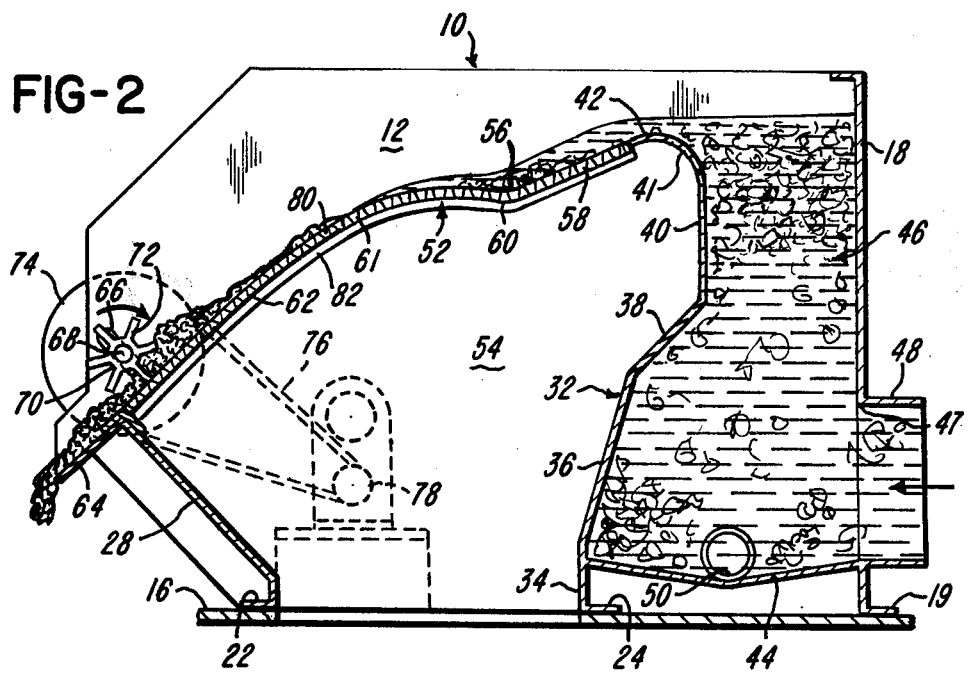

LOW PROFILE STATIC SCREEN

This application is a continuation of applicant's presently pending application Ser. No. 404,765, filed Oct. 9, 1973 bearing the title "LOW PROFILE STATIC SCREEN" now abandoned.

BACKGROUND THE INVENTION

This invention relates to apparatus for separating or classifying the contents of a flowing slurry. Embodiments feature a compact structure having a low profile and requiring a minimal head in delivery of the slurry for a fast and effective separating operation. They have a wide variety of application in agriculture, pulp and paper processing, sewage and waste water treatment, clarifying and like procedures.

Static screens such as provided by the present invention are highly desirable for use in industrial, argicultural and other processing applications because they are inherently cheaper to fabricate and easier to maintain. However, they have had limited application due to their heretofore relatively low efficiency and their basic blinding problems. Substantial advance in the efficiency and effectiveness of static screens was achieved in the development of the "Hydrasieve" screen, the subject of U.S. Pat. No. 3,452,876, which screen substantially expanded commercial use of static screens. While this new development has been very important, there still remain situations and applications requiring lower cost units of this category and units which have added capabilities such as evidenced in various separating equipment of the prior art which embody shaking or vibrating components. General usage in industry has proven the significant advantage of embodiments of the invention in handling low consistency slurries embodying particularly fibrous and adherent solid particles. The present invention has also proven to be effective, in the embodiment thereof, to carry forward and render desirable the use of static screens for even such difficult applications as require the handling of slurries embodying particularly sticky and adherent solid particles or having relatively sluggish consistency.

SUMMARY OF THE INVENTION

The invention enables static screen separators incorporating a low profile composite screen assembly distinguished by screen sections having differing orientation and configuration.

In preferred embodiment the screen assembly of the invention presents a descending flow surface fed from a connection head box which is relatively low in vertical extent. The low profile configuration of the head box and the related screen enables the use of gravity feed or a relatively simple low heat pump unit to deliver a flowing slurry for separation in moving down the screen flow surface. An obvious benefit is a minimizing of the power required to move the slurry to and through its separating operation. The cross sectional area of the head box is restricted adjacent its upper end, immediately preceding its discharge lip, to reduce turbulence and increase flow velocity in discharge of the slurry onto the upper end of the screen surface.

The design of the screen type flow surface is such to maximize the initial extraction of liquid in movement of the slurry thereacross and to cause an accumulation and rolling of the solid content to expedite the discharge thereof from the screen flow surface at its lower end. The screen flow surface, in preferred embodiment, is characterized by its upper end portion having a relatively shallow slope the angle of which to a horizontal is not substantially less than 20° and not substantially greater than 35° followed by a generally horizontal portion which merges into a portion of arcuately convex configuration capable of affording a maximal drainage of liquid in movement of the solids thereacross while inducing the rolling and gathering of the solids in discharge, as aforementioned.

Modifications of the basic embodiment of the invention contemplate the application of a roller-type element immediately above the screen flow surface towards the discharge end thereof. Depending on the direction in which the roller-type element is moved, one can achieve selective drainage characteristics in the use of the invention embodiment, towards the discharge end thereof.

A primary object of the invention is to provide a static screen type separator which is more economical to fabricate, more efficient and satisfactory in use, adaptable to a wide variety of application and unlikely to malfunction.

A further object is to provide a static screen type separator embodying a screen type flow surface which descends from an upper to a lower end thereof in a profile which has sections of differing orientation and configuration.

Another object of the invention is to provide a static screen type separator having associated therewith a head box which in combination is so designed to afford a minimal back pressure to interfere with a fast, easy and effective delivery of slurry for separation of liquid therefrom in the movement thereof down the screen flow surface.

A further object of the invention is to provide a generally new concept in static screen separators which obviates and reduces normal losses of efficiency incident to use of static type screens for separating purposes.

An additional object of the invention is to provide a low profile separator assembly wherein there is a low head loss in delivery of a slurry to be separated on a flow surface provided by a static screen unit.

Another object of the invention is to provie roller means in conjunction with a descending static screen which renders such screen more efficient and satisfactory for use in separating liquid from the solid content of a flowing slurry.

Another object of the invention is to provide a static screen type separator assembly possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein are shown some but not necessarily the only forms of embodiment of the invention, FIG. 1 shows the screen type static separator in accordance with a preferred embodiment of the invention in a generally diagrammatic form and by way of a longitudinal section of the structure provided;

FIG. 2 is a view similar to that in FIG. 1 showing the addition of a roller-type liquid separating device operating in accordance with a contemplated modification of the structure of FIG. 1;

Like parts are indicated by similar characters of reference throughout the several views.

Figure 4:
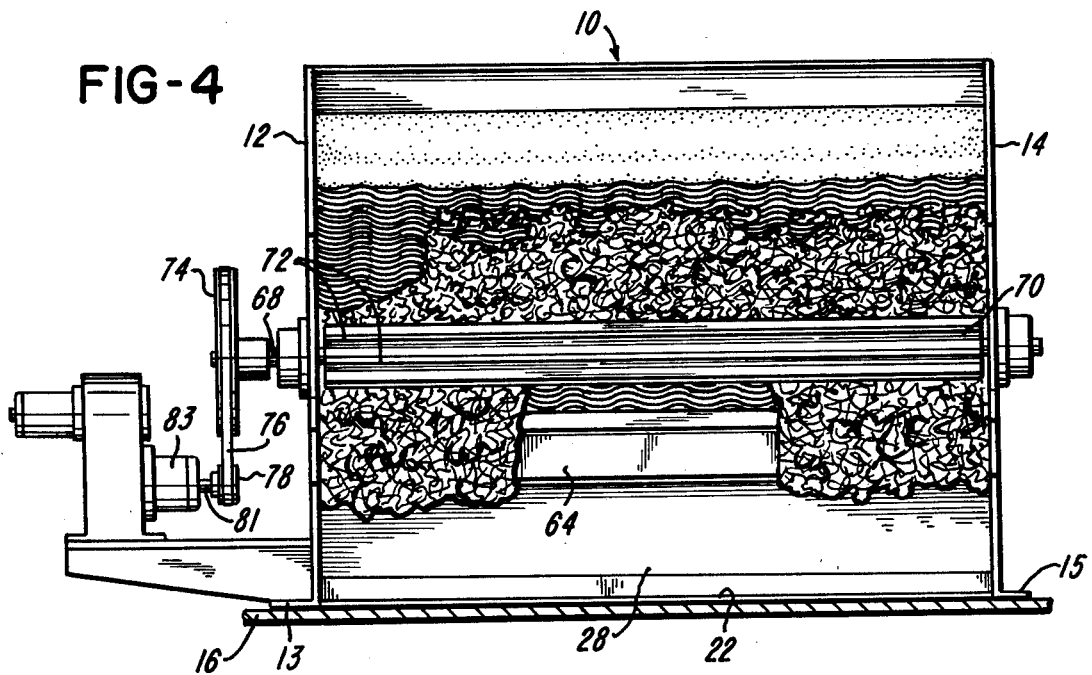
FIG. 4 is a front elevation view of the discharge end of the structure shown in FIG. 2.

As seen in the drawings, a separator 10 in accordance with a basic embodiment of the invention comprises a pair of generally parallel, transversely spaced, vertically projected side plates 12 and 14. The lower ends of the plates 12 and 14 have oppositely and outwardly directed right angled flanges respectively identified by the numerals 13 and 15. The flanges 13 and 15, as illustrated in FIG. 4, are co-planar and provide feet by means of which the plates 12 and 14 may be seated and suitably secured to a ground or mounting surface 16. At what may be considered their rear ends, the plates 12 and 14 are bridged by a back wall or plate 18. The latter has as its base an outwardly turned flange 19 which may also be bolted or otherwise secured to the surface 16.

Extending between and connected to the side plates 12 and 14 at a position forwardly of the back plate 18 is a plate structure 32 having a variously angled configuration. The plate structure 32 may be integrally formed or formed in segments which are welded together to effect a sealed connection thereof. Its segments include a relatively shallow segment 34 which is lowermost. The segment 34 positions in a parallel substantially spaced relation to the back wall 18 and includes at the base thereof a right angle flange 24 providing a base support under the plate structure 32 which seats to the mounting surface 16 in the manner of the flanges 13, 15 and 19. The segment 34 is extended upwardly by a plate segment 36 which is substantially deeper in a vertical sense and inclines slightly from the vertical in the direction of the back wall 18. Extending from the uppermost end of the segment 36 and inclined at a more acute angle to the back wall 18 is a plate segment 38, from the uppermost edge of which extends a plate segment 40. The latter positions in parallel and relatively closely spaced relation to the back wall 18 and its uppermost end is continued by a plate segment 41 of uniformly arcuate configuration. The segment 41 is formed on a small radius to smoothly depart in a sense away from the back wall 18 to reach an apex or uppermost end 42 of the plate structure 32 which is in a line parallel to but at a level lower than the uppermost edges of the side plates 12 and 14 and the back plate 18.

Adjacent but spaced from their lowermost ends, the back wall 18, plate structure 32 and the portions of the side plates 12 and 14 therebetween are bridged by a trough-shaped plate structure 44 which is centrally depressed. The plate structure 44 forms, together with the plate structure 32, the back wall 18 and the portions of the side plates 12 and 14 therebetween, a head box 46. The head box, as will be seen, is of relatively shallow construction having a substantial cross-sectional area adjacent its bottom to which may be delivered, by way of an aperture 47 rimmed by a cylindrical adapter 48 in the back wall 18, a slurry. Opening from the body of the head box, at the level of the depressed portion of the trough shaped plate structure 44 is an aperture 50 which is normally capped. The aperture 50 can obviously serve as a drain, as and when required.

Spaced forwardly of the plate structure 32 is a further plate structure 28. The plate structure 28 has a sharp forward inclination and includes at its lower end a right angled flange portion 22 co-planar with and parallel to the flanges 19 and 24. The upper end of the plate 28 has a right angled and downwardly directed portion 64 which, as will be seen, forms a discharge apron for screen structure 52 which extends between the side plates 12 and 14 and from the apex 42 of the plate structure 32. As will be obvious from the drawings, the end of the screen structure 52 which connects with the apex portion 42 of plate structure 32 is relatively elevated with respect to the uppermost end of the plate structure 28 from which extends the apron 64.

The screen structure 52 comprises, in descending order, screen sections or segments 58, 60, 61 and 62.

The screen section 58 is suitably connected to form a continuation of the terminal upper extremity of the plate structure 32 and to extend smoothly and downwardly therefrom so that the uppermost surface thereof has a planar or substantially planar configuration. It is recommended for best operating efficiency of the invention structure that the screen section 58 have its upper or flow surface portion at an angle of 20° to 35° to a horizontal plane which extends through its lowermost extremity. For optimal results it has been found that this angle should be in the neighborhood of 25° and preferably between 25° and 30°. The lower end of the screen section 58 merges with and is extended by the screen section 60 which is of limited longitudinal extent and its flow surface lies, preferably, in a substantially horizontal attitude. The section 60 merges with and is extended by the screen section 61 which has an arcuately convex configuration at its uppermost surface which forms part of the flow surface provided by the screen structure 52. The screen section 62 forms, in the example illustrated, the lowermost part of the screen structure 52 and the portion thereof defining its flow surface provides an extension of that of the screen section 61 and is generally tangential thereto.

As seen in FIG. 4 of the drawings, the screen structure 52 and its various sections is preferably formed of transversely arranged, longitudinally spaced, wave-line bars 80 defining a flow surface, which bars are interconnected in their spaced relation by transversely spaced longitudinally extending underlying support bars 82. The connection of the bars 80 to the support bars 82 is such to define in the screen flow surface a series of longitudinally and transversely spaced arcuate slots. Each slot preferably has the form of a single curve of shallow contour and its apex will be directed in the sense of flow down the surface of the screen structure 52. This screen bar construction of preferred form is similar to that employed in the aforementioned U.S. Pat. No. 3,452,876 and has its attendant advantages. It should be understood, however, that the improvements of the present invention lend themselves to a use with other screen structures such as those wherein the screen bars such as the bars 80 are straight rather than of wave-line form.

In the case of the basic invention embodiment as shown in FIG. 1 a slurry which may be comprised of liquid sewage or a pulp slurry embodying fibrous solids, for example, may be gravity fed and/or pumped to the shallow head box 46. Minimal power is required for the pumping operation due to the low head aspect of the head box and screen construction. The delivery of a high volume flow to and through the head box is facilitated by the restriction of the cross sectional area of the head box adjacent its upper end. The form of construction of the head box thus provided insures that at the top of the head box chamber the slurry delivered will be accelerated in its flow while the flow thereof may be kept in a relatively non-turbulent condition by reason of the gentle expansion of the head box adjacent the apex of its front wall, which provides a delivery lip smoothly merging with the upper end of the screen section 58.

With reference to FIG. 1, there is a relatively smooth, quiet and rapid overflow of the slurry from the head box and the slurry is accelerated down the relatively flat slope of the screen section 58 thereby until impact with the connecting end of the relatively horizontal screen section 60. It has been found in practice that in the course of its initial flow and contact with the screen segment 60 reactant forces are produced with reflect through the flowing slurry to act together with the screen bars in a manner to induce an extraction or separation of a large percentage of liquid from the flowing slurry through the slots defined in the screen section 58. It has been further found that in the juncture 56 of the sections 58 and 60 most solids commence to form in rolls or bundles due to the significant separation of liquid from the portions of the slurry in which they are embodied. From the point of contact with, and impact on, and in movement over the screen section 60 the change of direction for the flow of the now higher consistency slurry is such to cause the solids therein to move relatively outward from the flow surface. Consequently, in the outward cascading movement induced in the flowing slurry, by reason of the screen configuration immediately following the section 60, the solids tend to lift tangentially away from the screen flow surface while the slurry liquid remaining tends to move inwardly. This results in a significant further extraction of liquid which occurs due to its relatively free drain and separation enabled thereby together with a tendency of the separating liquids to adhere to the screen flow surface. The solids are within a relatively short longitudinal extent of the screen flow surface caused to be significantly separated from liquid and to accumulate relatively thickly and in rolling form across the screen as they move under the influence of gravity down the flow surface of the screen section 62 and over the apron 64, from which they drop to a suitable receptacle for salvage or disposal as the particular application might dictate. One result of the structure thus described is the significant reduction of screen abrasion and wear normally incident to use of static screens.

As will be seen, the invention produces a highly compact, high capacity, low profile static screen separator, a feed to which may be easily effected with minimal power requirements. The technical theory cannot be completely explained but it appears from tests and applications observed that the particular configuration of the low profile screen flow surface contributes to maximal utilization of the Coanda effect applied to the movement of the slurry over the screen. The effectiveness of the separation is such that as observed the liquid appears to move vertically through the screen structure 52 and in particularly large volume at the upper end of the screen. It will be obvious that there is defined below the screen structure 52 an effluent receiving chamber 54 and that the effluent may be passed through the bottom opening defind between the plate structures 28 and 32 to be routed for disposal or further treatment. While the profile of the invention screen structure 52 approaches an arcuate form, one of generally convex configuration, the departure from a convex configuration has, as indicated, achieved unobvious separating influences. Contributing, of course, is the particular form of the head box 46.

Figure 3:
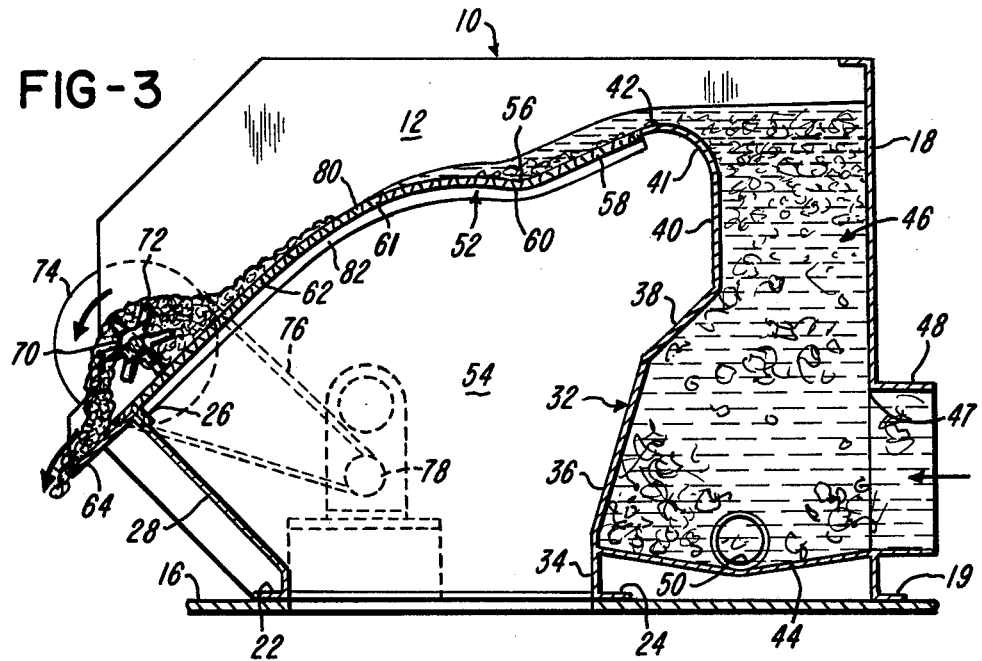
FIG. 3 is a view similar to FIG. 2 showing the effect of a reverse operation of the roller device illustrated in FIG. 2.

FIGS. 2 through 4 of the drawings illustrate, in application to the structure of FIG. 1, the positioning across the lower end portion of the flow surface of the screen structure 52 of a ribbed or splined roller 70. The roller 70 is fixed on a shaft 68 which extends through and bears in angularly oriented slots in the side plates 12 and 14, which slots are identified by the numeral 66. To one end thereof the shaft 68 mounts a drive pulley 74 coupled by a belt 76 to a pulley 78 fixed on and driven by the drive shaft 81 of a motor 83 mounted on an arm suitably fixed to project outwardly from side plate 12. Suitable means, of obvious nature, can be used to adjust the shaft 68 to and from the surface of the screen section 62, in accordance with the desired function of the ribs 72 on the roller element 70. Details of these adjusting means are not here described since they may be contrived in various fashion by a mechanic versed in the art.

Referring to FIG. 2, it will be seen that the ribs 72 of the roller 70, which is preferably made of rubber or like material, will extend in scraping relation to the screen flow surface. As the device 70 is rotated clockwise, as shown in FIG. 2, one can have a controlled discharge of the solids which are moved towards the discharge end of the screen segment 62 and in the process successive relatively thick bundles and rolls of the solids are squeezed and compressed as they are moved past the position of the roller and by the ribs thereof. The result is a squeezing action and further drying of the solids as they are discharged.

On counter-clockwise rotation of roller 70 as shown in FIG. 3, the roller ribs 72 will in this instance lift up the solids encountered thereby at the lower end of the screen structure and in lifting the solids enable a relatively free drain therefrom of any remaining free liquids. The advantages and benefits thereof are believed obvious.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for separating and classifying the contents of a flowing slurry including a descending flow surface defined, at least in part, by static screen structure sections of which form longitudinally extending parts of said flow surface, said screen sections being formed to influence liquid to separate from a slurry in the course of its movement across said flow surface, an upper of said sections providing a part of said flow surface which is downwardly inclined to form an angle not substantially greater than 35° with an intersecting horizontal plane, a further of said screen sections providing another part of said flow surface having an arcuately formed generally convex profile, and another of said screen sections being located between said upper and said further screen sections to provide an additional part of said flow surface which has a generally horizontal orientation and provides an impact surface interposed in the path of a slurry flowing down said upper part of said flow surface at a position to create therein reactant forces which influence a substantial separation of liquid from the flow, said impact surface being constructed and arranged for influencing solids in the impacting portion of the slurry flow to lift away from said screen structure as the remaining liquid content of the slurry is caused to move from said impact surface and downwardly of said further screen section providing said part of said flow surface having a convex profile.

2. Apparatus for separating and classifying the contents of a flowing slurry as in claim 1 characterized by said additional part of said flow surface having a generally horizontal orientation being defined by a screen section which forms, substantially, a continuation of that part of the flow surface defined by said upper screen section.

3. Apparatus as in claim 2 characterized by said additional part of said flow surface having a relatively short longitudinal extent and being substantially immediately followed by said part of said flow surface which has a generally convex profile.

4. Apparatus as in claim 1 including means defining a lower end of said flow surface being arranged to extend tangential to and downwardly from said part having a convex profile.

5. Apparatus as in claim 1 characterized by a head box one wall of which has a discharge lip merging, substantially, with the upper end of said flow surface, said head box providing means for directing a slurry to move to and down said flow surface and having a cross section which is restricted adjacent said discharge lip, to add velocity to the slurry as it moves through and from the head box and over said discharge lip and gently expanded above said restriction to the apex portion of said one wall thereof which includes said discharge lip.

6. Apparatus as in claim 5 wherein said head box has a depth providing a low head for the supply of slurry therein which is directed to said descending flow surface.

7. Apparatus as in claim 1 wherein said descending flow surface has a low lying profile a limited longitudinal extent and includes an upper end portion which is oriented at an angle to a horizontal not exceeding 35°.

8. Apparatus as in claim 1 wherein the angle of inclination of the part of said flow surface provided by said upper of said screen sections to a horizontal is in the range of 20° to 35°.

9. Apparatus as in claim 1 wherein said angle is in the neighborhood of 25°.

10. Apparatus as in claim 1 including means at the lower part of said flow surface to compact and compress the discharging solids, to extract further liquid therefrom.

11. Apparatus as in claim 1 wherein means are provided at the lower part of said flow surface to engage and lift solids moving down said flow surface to facilitate the drainage therefrom of free liquid.

12. Apparatus as in claim 1 wherein roller means are applied to a lower part of said screen flow surface to induce a supplemental separation of liquid from solids passing down said flow surface by controlling the movement thereof.

13. Apparatus as in claim 1 including a head box, means for supporting said head box and said structure defining said descending flow surface to position the same in spaced elevated relation to a mounting surface, means forwardly of said head box arranged to project upwardly from the mounting surface and to support thereon the lower end of said structure providing said descending flow surface, and said upwardly projecting means having in connection therewith means forming an apron-like continuation of the lower end of said descending flow surface.

14. Apparatus as in claim 1, including side walls and a relatively transversely disposing back wall, said back wall being embodied in means forming a head box the lower portion of the interior of which is adapted to position in an adjacent relation to a surface mounting said separator and an upper portion of which includes a discharge lip, said back wall including means defining an inlet for the inflow to said head box of a slurry comprised of liquid entraining solids, said inlet being located below said discharge lip, said head box providing for the moving slurry to rise therein and overflow said discharge lip, and said flow surface having its upper end fed from said discharge lip and its lower end below said discharge lip but elevated relative to the lower portion of the interior of said head box.

15. Apparatus according to claim 14, wherein said head box has a cross sectional restriction preceding its said discharge lip, which lip is formed to smoothly expand the cross section of said head box at the upper end thereof to provide thereby for a smooth non-turbulent overflow of slurry onto the upper end of said descending flow surface, which is disposed to form a continuation of said lip.

16. A static screen separator according to claim 15, characterized by a support for the lower end of said screen sections including means defining an apron-like extension of said descending flow surface.

17. A low profile static screen separator including screen structure defining a descending flow surface comprising screen sections forming longitudinally extending parts of said flow surface successive of which have different profile and orientation, an upper of said screen sections defining a part of said flow surface which has a relatively shallow slope the angle of which to a horizontal is not substantially less than 20° and not substantially greater than 35°, and a following of said screen sections having its flow surface portion substantially horizontal to cooperate with said upper of said screen sections to provide reactant forces inducing maximum liquid separation from a slurry as it moves down the upper end of said descending flow surface, and said following part of said flow surface being continued by a portion of said flow surface which has an arcuately convex configuration.

18. A low profile static screen separator including means defining a descending flow surface including a first screen section providing an upper part of said flow surface having a substantially planar configuration arranged to move a slurry downwardly in a path which is at an angle in the range of about 20° to 35° to a horizontal, said first screen section being directly followed by a second screen section defining a following part of said flow surface having a generally horizontal attitude to interpose an obstruction to induce reactive forces in the downflowing slurry to create influences inducing a substantial separation of liquid from the slurry and passage thereof through said screen sections, and a third screen section forming a part of said flow surface having a configuration to change the direction of the flow of the remainder of the slurry to move in an extended arcuate path within a relatively short vertical descending portion of the screen flow surface whereby to influence an increased draining of liquid from the slurry as it moves to discharge from said flow surface at the lower end portion thereof.

* * * * *

UNITED STATES PATENT AND TRADEMARK OFFICE
CERTIFICATE OF CORRECTION

PATENT NO. : 4,042,511
DATED : August 16, 1977
INVENTOR(S) : Marvin E. Ginaven

It is certified that error appears in the above-identified patent and that said Letters Patent are hereby corrected as shown below:

Col. 1, line 18, "argicul" is corrected to read -- agricul --;

line 51, "connection" is corrected to read -- connected --;

line 54, "heat" is corrected to read -- head --.

Col. 2, line 45, "provie" is corrected to read -- provide --.

Col. 3, line 35, "angle" is corrected to read -- angled --.

Col. 4, line 63, "case" is corrected to read -- use --.

Col. 5, line 19, "with" is corrected to read -- which --;

line 68, "defind" is corrected to read -- defined --.

Signed and Sealed this

Fifteenth Day of November 1977

[SEAL]

Attest:

RUTH C. MASON
Attesting Officer

LUTRELLE F. PARKER
Acting Commissioner of Patents and Trademarks